United States Patent
Subasic et al.

(10) Patent No.: US 9,646,099 B2
(45) Date of Patent: May 9, 2017

(54) GENERATING RESOURCES FOR SUPPORT OF ONLINE SERVICES

(71) Applicant: NTT DOCOMO Inc., Tokyo (JP)

(72) Inventors: Pero Subasic, Palo Alto, CA (US); Hyung Sik Shin, Palo Alto, CA (US); Ronald Sujithan, Palo Alto, CA (US); Hongfeng Yin, Palo Alto, CA (US); Sayandev Mukherjee, Palo Alto, CA (US); Yoshikazu Akinaga, Palo Alto, CA (US)

(73) Assignee: NTT DOCOMO INC., Tokyo (JP)

( * ) Notice: Subject to any disclaimer, the term of this patent is extended or adjusted under 35 U.S.C. 154(b) by 0 days.

(21) Appl. No.: 14/871,656

(22) Filed: Sep. 30, 2015

(65) Prior Publication Data
US 2016/0026723 A1    Jan. 28, 2016

Related U.S. Application Data

(63) Continuation of application No. PCT/US2014/067479, filed on Nov. 25, 2014.

(60) Provisional application No. 61/910,000, filed on Nov. 27, 2013.

(51) Int. Cl.
*G06F 17/27* (2006.01)
*G06F 17/30* (2006.01)

(52) U.S. Cl.
CPC .... *G06F 17/30873* (2013.01); *G06F 17/3071* (2013.01); *G06F 17/30312* (2013.01); *G06F 17/30598* (2013.01); *G06F 17/30699* (2013.01)

(58) Field of Classification Search
USPC ...................................... 704/7–10
See application file for complete search history.

(56) References Cited

U.S. PATENT DOCUMENTS

| | | | |
|---|---|---|---|
| 6,415,283 B1 * | 7/2002 | Conklin | G06F 17/30961 |
| 2006/0242147 A1 * | 10/2006 | Gehrking | G06F 17/30707 |
| 2009/0254572 A1 * | 10/2009 | Redlich | G06Q 10/06 |
| 2012/0109966 A1 * | 5/2012 | Liang | G06F 17/30643 707/740 |
| 2012/0131139 A1 * | 5/2012 | Siripurapu | H04L 65/60 709/217 |

OTHER PUBLICATIONS

International Search Report and Written Opinion, PCT Patent Application No. PCT/US14/67479, Feb. 24, 2015, 11 pages.

* cited by examiner

*Primary Examiner* — Leonard Saint Cyr
(74) *Attorney, Agent, or Firm* — Haynes and Boone, LLP (57) ABSTRACT

A system and method is provided to analyze a database of concepts organized into categories, wherein each concept is an online textual document, to determine a numerical relationship between the concepts and to determine a hierarchy for the categories.

12 Claims, 6 Drawing Sheets

GENERATING RESOURCES FOR SUPPORT OF ONLINE SERVICES

RELATED APPLICATIONS

This application is a continuation of PCT Patent Application No. PCT/US2014/67479, filed Nov. 25, 2014, which claims the benefit of U.S. Provisional Application No. 61/910,000, filed Nov. 27, 2013, the contents of both which are incorporated herein by their entireties.

TECHNICAL FIELD

The present disclosure relates generally to database processing, and more particularly to the processing of a database having concepts organized into categories to weight the similarity of concepts within the database.

BACKGROUND

Online services can increase their popularity if user interaction can be intelligently processed to make recommendations to the user. For example, an application running on a web page server may recommend additional webpages to a user based upon their current usage. In that regard, substantial encyclopedic databases currently exist such as Wikipedia that provide a vast amount of information regarding concepts such as "New York" or "Madonna" and so on. If such databases could be automatically analyzed to determine the relationship between concepts, recommendations to the user become more accurate, which supports user interaction and engagement.

Because the discovery of relationships between concepts in an online database is thus so valuable, considerable efforts have been expended attempting to provide such relationship analyses. Unfortunately, however, current analyses have been developed only on a case-by-case basis with regard to specific databases. Such applications are generally valid only for a single language usage and difficult or impossible to transfer to other languages. Update of resources in conventional applications with regard to concept relationships thus involves a substantial amount of manual intervention.

There is thus a need in the art for an application that can process a database to discover relationships between concepts in the database.

SUMMARY

In one aspect, a system is provided for analyzing a database of concepts organized into categories. The system is configured to perform a method that includes the act of counting for each category, the number of first ones of the concepts for which the category is a first-level category that directly includes the first concepts, the number of second ones of the concepts for which the category includes the second concepts only through the second concepts being members of other ones of the categories that in turn include the second concepts, and so on up to the number of nth ones of the concepts for which the category is an nth-level category, n being a plural positive integer. In addition, the method includes the act of, for each category, classifying the category as having into a level having a highest count. Finally, the method includes the act of, for each category classified at each level, determining those classified categories having the most significant concepts based at least upon a page rank of the category's concepts to determine a set of classified categories for each level having the most significant concepts.

Additional features and advantages of the systems and methods disclosed herein may be better appreciated through the following detailed description.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Conceptual analysis of an encyclopedic database to provide additional online resources differs from statistical approaches. For example, an application hosting a commercial website will typically review purchases statistically so that once an item is purchased, the application can suggest related items that were also purchased by other users who purchased the same item. But such an analysis has nothing to do with the item itself and its conceptual relationship to the related items. The systems and methods disclosed herein do not just use the past behavior of a user's web browsing but instead analyzes a database to numerically characterize the interrelatedness of concepts in the database. In this fashion, if a user is reading a webpage with a given concepts, webpages with related concepts may be intelligently recommended to the user.

As used herein, a "concept" is a database entity having textual information associated with it that would include links to other concepts in the database. An example database of concepts is Wikipedia, wherein each concept is denoted as an article. These articles are organized into categories.

Each category is a collection of related articles. Although the following analysis will be dedicated to an analysis of the concepts in Wikipedia, it will be appreciated that the analysis disclosed herein is widely applicable to any database having concepts, each concept being a textual database entry that may contain links to other concepts in the database. An analogy to a concept is a record within a spreadsheet database. Typically, each record is a row in the spreadsheet containing a number of fields. The words associated with a database entity or "concept" are thus analogous to the fields for a row (or record) of a spreadsheet database.

Figure 1A:
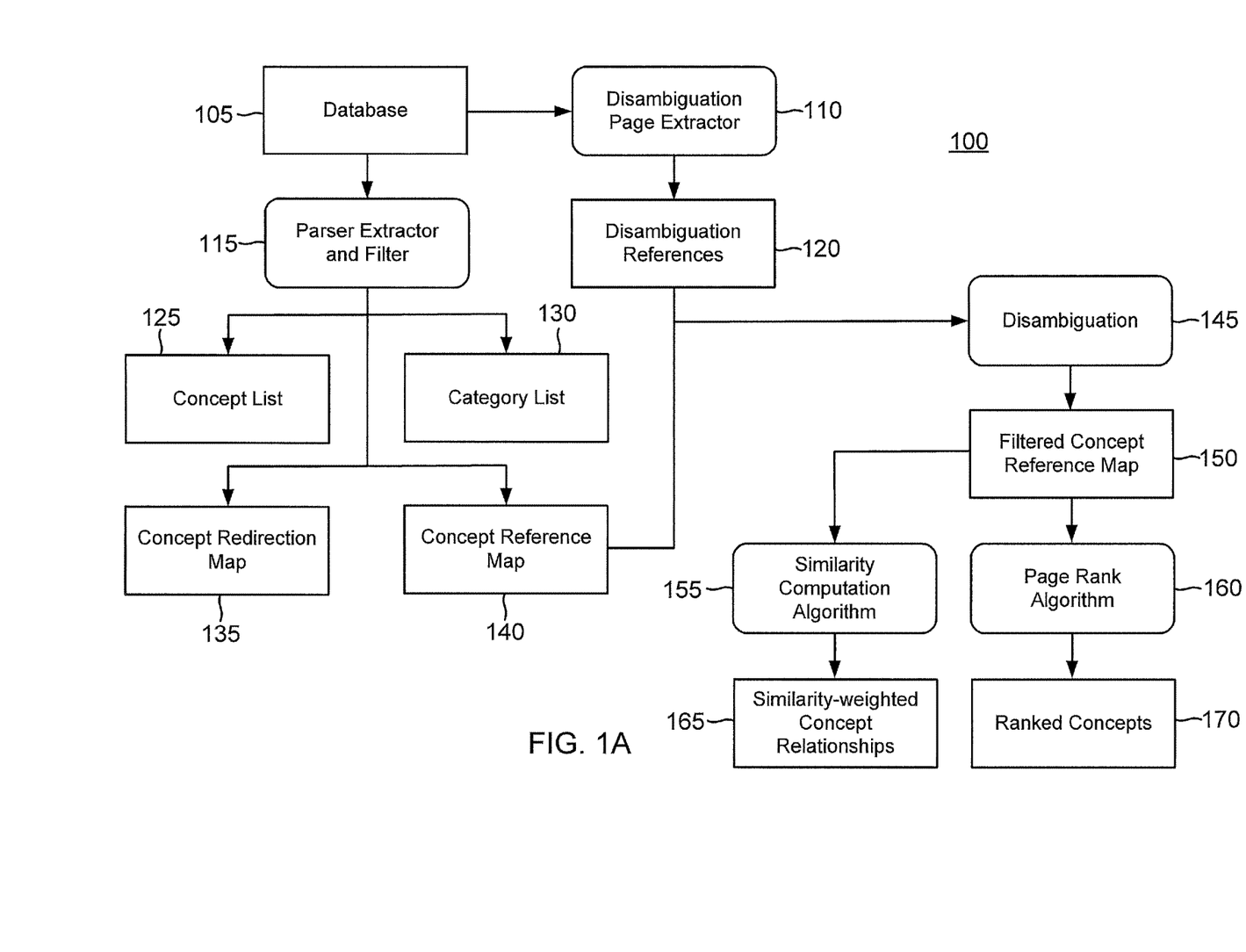
FIG. 1A illustrates a collection of modules for a system configured to analyze a database to determine the relationship between its concepts and categories in accordance with an embodiment of the disclosure.

A system is disclosed for performing the resource generation disclosed herein. This system comprises a number of modules. Each module may be implemented by a single computer or collection of computers. Alternatively, each module may be implemented using an ASIC or a configured field programmable gate array. FIG. 1A shows a high-level overview of an example system 100. System 100 operates to generate resources from a database 105. The following discussion will assume that database 105 is a Wikipedia database but it will be appreciated that similar databases may be analyzed in the same fashion by system 100. In Wikipedia, certain articles are not dedicated to concepts. For example, an internet search on "New York" will lead to a Wikipedia page dedicated to a textual article about the state of New York. But other Wikipedia pages are instead disambiguation pages. For instance, the term "Madonna" is ambiguous as it can mean a place, a pop artist, or a religious figure. With regard to such ambiguous concepts, Wikipedia may furnish a "disambiguation page" that lists the various concepts sharing the same name. Such disambiguation pages provide no information themselves regarding the relationship of one concept to another so system 100 may include a disambiguation page extractor module 110 to identify all Wikipedia disambiguation pages or references in a list 120.

Wikipedia provides a reference number for each separate web page or article. To identify all the concepts and categories by their reference number, system 100 may include a page parser, extractor, and filter module 115 that is configured to generate a concept list 125. This concept list 125 is a list of all concepts (which is to say separate web pages) in Wikipedia, including the disambiguation pages. In addition, module 115 generates a list of all categories for Wikipedia. In that regard, each substantive (non-disambiguation page) in Wikipedia lists one or more categories. For example, the Wikipedia page for "New York" indicates that this concept is included in the six Wikipedia categories of Former British Colonies, New York, States of the United States, Mid-Atlantic, Northeastern United States, and States of the East Coast of the United States. As shown by this example set of categories, a concept can also be a category as shown by the separate "New York" concept and category. Each category includes one or more concepts, which are equivalent to separate articles or web pages of textual content on a particular topic in Wikipedia.

Parser, extractor, and filter module 115 also generates a concept reference map 140. In that regard, each concept in Wikipedia may include hyperlinks to other Wikipedia concepts. Concept reference map 140 lists all such references to other concepts for each concept in Wikipedia. But note that some hyperlinks do not refer to the concept indicated by the textual reference in the hyperlink. For example, the Wikipedia page discussed above for "New York" includes a hyperlink of "third-most populous" that does not lead to a concept of "third-most populous" but instead to a webpage directed to the concept of "List of U.S. states and territories by population." As used herein, such references from one concept to another through a hyperlink that is phrased differently from the corresponding concept are denoted as redirects. Module 115 also generates a concept redirection map to list, for each concept, any redirects the concept may have to other concepts. As will be explained further herein, such redirects provide additional information regarding synonyms for a given concept that may be used to identify related concepts.

Concept reference map 140 identifies, for each concept, all referenced concepts including disambiguation pages. Since the disambiguation pages are already identified in list 120, a disambiguation module 145 may readily filter concept reference map 140 to form a filtered concept reference map 150 that lists only the referenced substantive concepts without including any disambiguation references. Concept reference map 150 may be used in a number of ways as discussed herein to relate a given substantive concept in Wikipedia to another substantive concept. The term "concept" as used in the following discussion will be understood to refer to substantive concepts (concepts that are not disambiguation pages) for purposes of brevity.

Note that the English version of Wikipedia has over 3.4 million articles directed to corresponding concepts. Such a bewildering number of concepts is essentially unmanageable in its raw form. But the techniques and systems disclosed herein address this complexity so that if a user indicates an interest in a given concept, related concepts as determined from concept reference map 150 may be identified to the user. Note the power of such as technique as the user may be web-browsing a web-page or making a request to a server that has nothing to do with Wikipedia. But the user's inputs to such applications may be analyzed to identify concepts. These concepts may in turn be processed to identify related concepts. To do so, system 100 may include a similarity computation module 155. Numerous algorithms may be implemented by module 155 to numerically characterize the relationship between concepts. For example, module 155 may use concept reference map 150 to calculate, for each concept, a similarity estimate of that concept to all remaining concepts. For example, consider the problem of determining the similarity between a given concept A and another concept B. Module 155 may first determine if there is any intersection between the concepts referenced by concept A (designated as RC(A)) and the concepts referenced by concept B (designated as RC(B)) as identified in the intersection RC(A)∩RC(B). If there is no intersection between these referenced concepts, there is deemed to be no relationship between concepts A and B. If this intersection exists, then module 155 also calculates the union of RC(A) and RC(B) as represented by RC(A)∪RC(B) and determines the expression $-\log((RC(A) \cap RC(B)/RC(A) \cup RC(B))$ to give a similarity score between concepts A and B. Such a similarity score is inversely related to the similarity between the concepts in that the most tightly-related concepts are deemed to correspond to the intersection of the referenced concepts being the same as the union of the referenced concepts (the log of 1 being zero, regardless of the base of the logarithm). As the intersection becomes smaller in comparison to the union, the logarithm of the resulting ratio becomes more and more negative such that the opposite of the logarithm becomes more and more positive. For each concept, an ordered score of related concepts can thus be generated. In some embodiments, a threshold may be applied to the ordered score to determine a subset of the most closely-related concepts to a given concept. Regardless of whether a threshold is applied, similarity computation module may thus generate an ordered list 165 of related concepts for each concept in Wikipedia in this fashion. Similarity computation module 155 may implement alternative algorithms in lieu of or in conjunction with the logarithmic formula just discussed. For example, similarity computation module 155 may use the Jaccard formula or the PMI formula to compute a numerical similarity between concepts. In addition, similarity computation module 155 may use the category membership of a given concept to select additional members in the category as related concepts.

In addition to processing the filtered concept reference map 150 to determine similar concepts through similarity computation module 155, system 100 may include a concept importance computation module 160. In one embodiment concept importance computation module 160 may use the Page Rank algorithm to determine the importance of a given concept. As known in the art, the Page Rank algorithm is a recursive process applied to the inbound links from other concepts that link to a given concept. Each concept in Wikipedia can thus be given a page rank score by module 160 as compiled in a list 170 of ranked concepts. In application, list 170 may be filtered according to some threshold to filter out less important concepts. Should a user browse a webpage that includes a number of concepts, the more important concepts can then be identified by determining if their page rank score exceeds the desired threshold. Note that such a filtering is restrictive in that it reduces the number of concepts that may relate to the concepts presented by a given user's interaction with system 100. In contrast, application of list 165 to find related concepts to a given concept is expansive in that it increases the number of concepts that may relate to a user's interaction with system 100. In that regard, a user's "interaction" with system 100 is defined herein to include the presentation of some content to system 100. This content may be a voice inquiry or a text-based inquiry such as "Find Italian Restaurants in Palo Alto." Alternatively, the content may be the text in a given webpage or news article that the user is currently browsing. Regardless of how this content is presented, system 100 may analyze it to determine related concepts and categories for the content. Since list 165 leads to an expansion of the number of related concepts whereas list 170 leads to a contraction of the number of related concepts, these lists may be used in an iterative fashion to first expand (or contract) and then contract (or expand) the number of related concepts with respect to a given user's interaction with system 100.

Figure 1B:
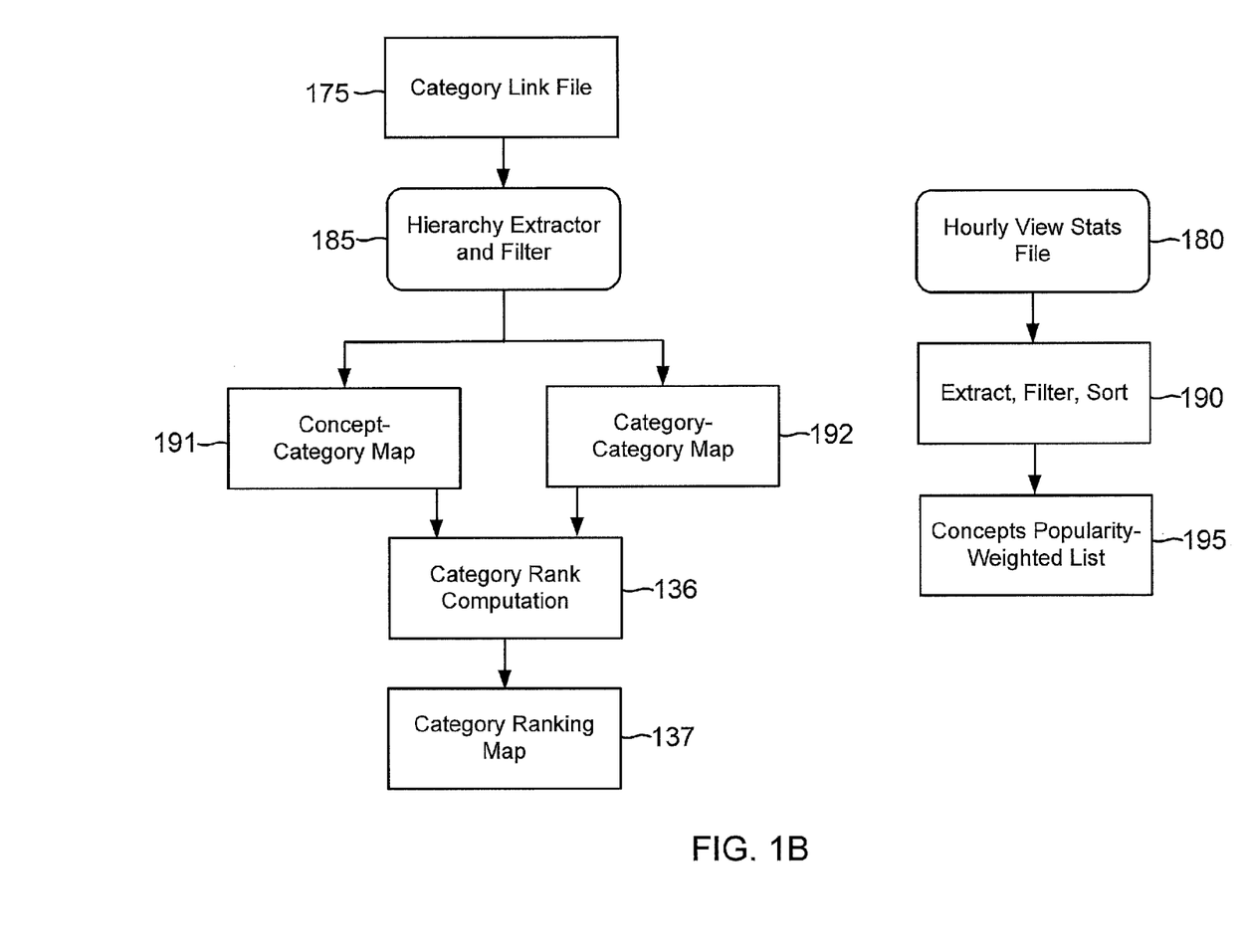
FIG. 1B illustrates additional modules for the system of FIG. 1A.
Figure 2:
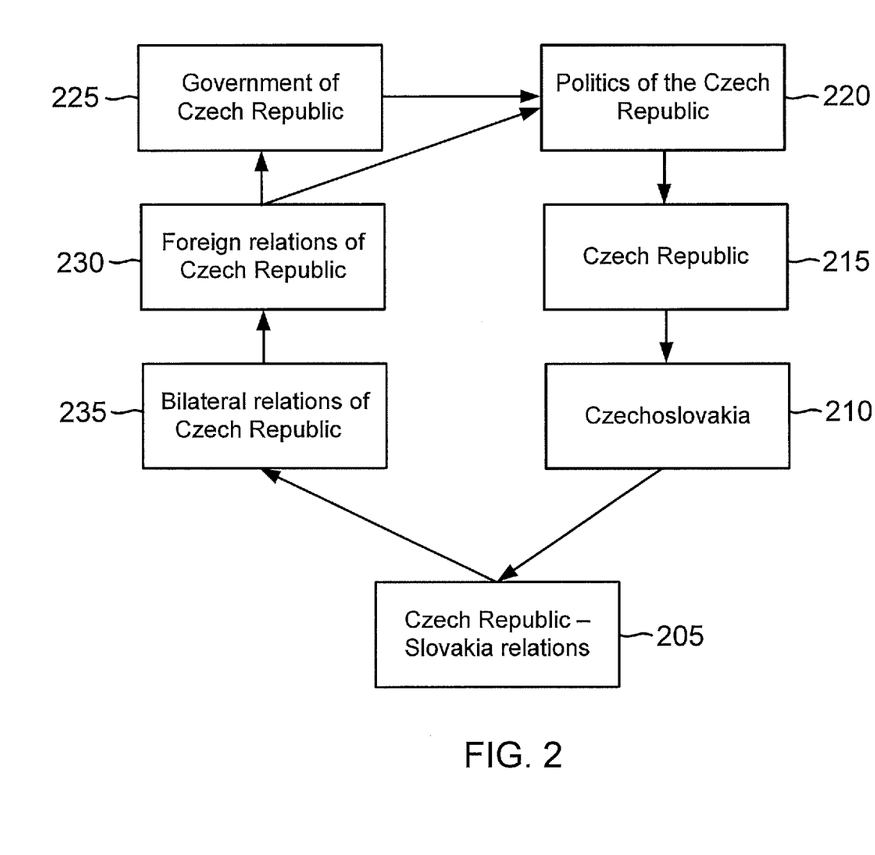
FIG. 2 illustrates a cycle for a set of categories in the database analyzed by the system of FIG. 1A.

System 100 may also include a hierarchy extractor and filter module 185 as shown in FIG. 1B that processes a category link file 175 from Wikipedia that lists the concepts included in each category as well as the category-to-category relationships. Module 185 may thus extract a concept-to-category map 191 that lists the concepts for each category and also extract a category-to-category map 192 that identifies the categories that are included within other categories. One issue with regard to identifying categories is that a database such as Wikipedia, being open sourced and formed by a community of independent editors, may have redundant or duplicative categories. For example, one category may be named "Computer Science" whereas another category may be named "Computer science." Such duplicative categories may be merged by module 185 such as by comparing strings for the category names without any capitalization. Module 185 thus acts to filter out redundant categories. Note that the category-to-category relationships identified in list 192 may be cyclic such as shown in FIG. 2 for an example set 200 of categories. In particular, a category 205 of "Czech Republic—Slovakia relations" includes a category 210 of "Czechoslovakia" but in turn is itself a category included within a category 235 of "Bilateral relations of Czech Republic." Similarly, category 235 is in turn included within a category 230 of "Foreign relations of Czech Republic" that in turn is included within a category 225 of "Government of Czech Republic" and a category 220 of "Politics of the Czech Republic." Finally, category 220 is included within a category 215 of "Czech Republic" that in turn is included within category 205 already discussed above. This circularity represents a problem with regard to determining category hierarchy discussed further below.

System 100 can also use the popularity of concepts as determined by their viewing statistics with regard to recommending other concepts and categories based upon a given user's interaction with system 100. For example, system 100 may include a popularity extraction module 190 as shown in FIG. 1B that processes an hourly view statistics file 180 that is provided by Wikipedia to generate a popularity-weighted concept list 195. List 195 may be used in conjunction with or in lieu of list 170 with regard to culling or reducing the number of concepts that are identified based upon a given user's interaction with system 100.

The various lists and rankings of concepts as well as their categories generated by system 100 may be used in remarkably advantageous ways to generate resources (concepts and categories) that relate to a user's interaction with system 100. For example, map 191 may be used to identify categories that include important concepts that in turn were identified by the user's interaction. In that regard, note that the relationship between concepts and categories is hierarchical in that certain concepts are included within a given category only through their inclusion in other categories. For example, referring again to FIG. 2, a concept of "Dissolution of Czechoslovakia" is one of the Wikipedia articles included within category 205. Category 205 may thus be deemed to a "first-level" category with regard to this concept. But the same concept is not a direct member of category 235 even though category 235 includes category 205. Nevertheless, this indirect relationship between the concept of "Dissolution of Czechoslovakia" to category 235 may be advantageously used by system 100 to identify important related concepts. Since this concept is just one category removed from category 235, category 235 may be deemed to be a "second-level" category with regard to the Dissolution of Czechoslovakia concept. In turn, category 230 would be a third-level category whereas category 225 would be fourth-level category with regard to the same concept. System 100 could thus work through the set 200 of concepts to determine their level with regard to a given concept. But the cyclic nature of the set 200 presents a problem in that category 205 not only directly includes the concept of "Dissolution of Czechoslovakia" but is also a $8^{th}$-level category with regard to this same concept. Similarly, category 205 could be deemed to also be a $15^{th}$-level category if system 100 continues to iterate around the cycle formed by set 200 indefinitely. To prevent this indeterminate looping around a given cycle of categories, each such cyclic set should be forced to become acyclic by breaking one of the category-to-category relationships in the cycle. For example, if category 215 is no longer deemed to include category 220 (deletion of an edge in the cycle), the set 200 is no longer cyclic such that a hierarchy for the resulting categories becomes definite and bounded. Alternatively, if category 220 is deleted from set 200 (deletion of a node in the cycle and its edges), the resulting hierarchy is also definite and bounded. Such a deletion of an edge or node may be semantically based. For example, category 210 relates to the no-longer existing country of "Czechoslovakia" and so this node and its edges may be deleted. Such a deletion may be accurate for present-day travel and tourism but would naturally be undesirable if a user's queries or interactions with system 100 are history related. It will be appreciated, however, that a typical database will have relatively few such cyclic arrangement of categories. For example, the English version of Wikipedia has over 400,000 categories but only around 20 to 30 such cycles. A human operator may thus make the appropriate semantic decision on how to break up such a relatively small set of cycles without incurring substantial burden.

Figure 3A:
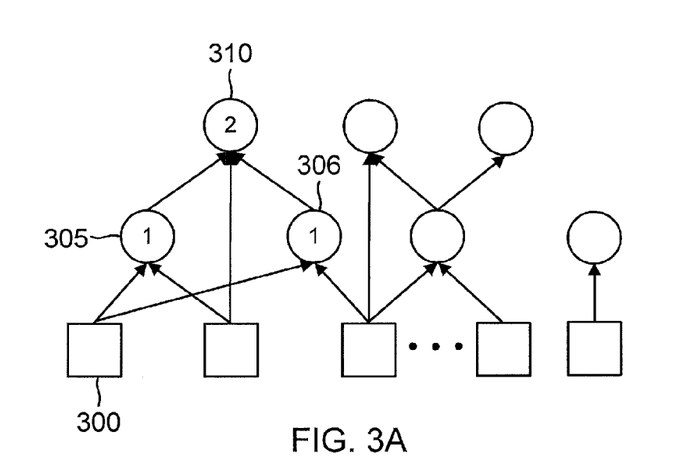
FIG. 3A illustrates a counting process for a first concept with regard to determining a category hierarchy for the database analyzed by the system of FIG. 1A.
Figure 3B:
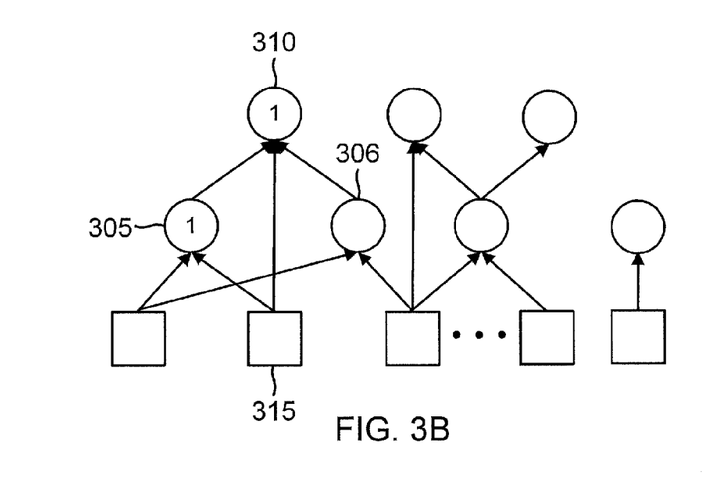
FIG. 3B illustrates the counting process of FIG. 3A being applied to another concept.

Regardless of how all the categories are made acyclic, the resulting acyclic categories may be advantageously analyzed to determine their hierarchy level as shown in FIG. 3A and FIG. 3B. With regard to this hierarchy, concepts such as concept 300 of FIG. 3A are considered at the zeroth level. Since a category 305 directly includes concept 300, category 305 may be deemed to a first-level category with regard to category 300. Similarly, a category 310 does not directly include concept 300 but does indirectly include this concept because category 305 is in turn included within category 310. Since category 310 is just "one level" higher in the hierarchy as compared to category 305, category 310 may be deemed to be second-level category with regard to concept 300. But as shown in FIG. 3B, another concept 315 is a direct member of category 310 such that category 310 is a first-level category with regard to concept 315. Note the ambiguity in that a given category such as category 310 may be one level with regard to one concept but may be another level with regard to another concept. This ambiguity makes it impossible to directly compare one category to another because the relative usefulness of a category diminishes as it moves higher in the hierarchy. For example, one can imagine that a category of "all concepts" would be too generic to provide any useful information for the concepts that it contains. Higher and higher level categories thus provides less and less information about the concepts they contain. The hierarchy may thus be arbitrarily terminated at some level—for example, system 100 may calculate no higher than a fourth-level category in one embodiment.

Regardless of where the threshold lies with regard to calculating additional levels in the category hierarchy, the ambiguity in levels makes direct comparison of one category to another problematic. In particular, since first-level categories will contain more information about their concepts than will second-level categories (which in turn provide more information than third-level categories, and so on), the ranking of first-level categories is performed most accurately by comparison of a given first-level category to only other first-level categories. Similarly, second-level category comparisons should only be made with other second-level categories, and so on. But making same level comparisons in impossible on the raw categories due to the ambiguity of what level a given category occupies. To solve this ambiguity, system 100 may include a category rank computation module 136 as shown in FIG. 1A. Referring again to FIGS. 3A and 3B, module 136 may use concept-to-category map 191 and category-to-category map 192 to determine, for each concept, the relative level of any categories that either directly or indirectly include the category. A count is determined for each concept with regard to the number of times it is included (directly or indirectly) within a given category. For example, concept 300 of FIG. 3A is included directly in categories 305 and 306. Each of categories 305 and 306 thus each get a count of one with regard to a first-level classification. On the other hand, concept 300 is indirectly a member of category 310 through both category 305 and category 306 such that category 310 receives a count of two with regard to a second-level classification. Should another category (not illustrated) include category 310, that category would receive a count of two with regard to a third-level classification, and so on. Each concept may thus be considered to be placing a "vote" as for the level classification of the categories that directly or indirectly include the concept, where the vote is the count that results in the corresponding categories as shown for FIG. 3A. In this level classification done on a concept-by-concept basis, a category is given a count towards a first-level classification if it directly includes the corresponding concept. Conversely, a given category is given a count towards a second-level classification if it indirectly includes the corresponding concept only through the corresponding concept being directly included in one or more categories that in turn each include the corresponding concept. Similarly, a given concept is given a count towards a third-level classification if it indirectly includes the corresponding concept only through the corresponding concept being directly included in one or more first categories that in turn are included in one or more second categories that in turn are included in the given concept. In this fashion, each additional level classification involves another "hop" through an intervening category.

The counts from concept 315 are shown in FIG. 3B. In this case, category 305 gets another count with regard to a first-level classification. In contrast to the second-level classification with regard to concept 300, category 310 gets a count with regard to a first-level classification from concept 315 as concept 315 is directly included in category 310. The conflict between concepts 300 and 315 with regard to the classifications is determined by the total number of counts (which as discussed above may be analogized to votes for a given classification level) from each concept. For example, after all concepts have been processed by module 136, suppose that a given category has 30 counts at level 1, 132 counts at level 2, 20 counts at level 3, and 0 counts at level 4. Because the highest count is at level 2, module 136 would classify the category as being a level 2 category even though this same category had assorted counts at level 1 and level 3 as well. With all categories classified in this fashion, module 136 may then list the classified categories in a category ranking map 137. However, note that the English version of Wikipedia has over 400,000 categories. Even with these categories all classified by module 136, category ranking map 137 would still be unwieldy to use given this multiplicity of categories. Thus, category rank computation module 136 may also filter the classified categories using ranked concept map 170. For example, module 136 may average the concept rank for all the concepts in a given classified category and compare the average to a threshold value. Module 136 may then include only those classified categories that exceed the desired threshold in category ranking map 137. Consider the remarkable utility of map 137—for the first time, the diverse categories in a database such as Wikipedia are intelligently classified into filtered levels such that each filtered level comprises the categories having significantly ranked concepts.

The resulting resources from system 100 may then be applied in myriad ways to identify relevant concepts and categories corresponding to a user's interaction with system 100. For example, suppose system 100 is presented with a textual document corresponding to a webpage that a user is currently utilizing. In general, it is formidable task for a machine to comprehend written documents, particularly as the word count for the document is increased. But system 100 uses a database such as Wikipedia as a proxy for human comprehension of a document in that Wikipedia is such a vast collection of knowledge that it closely mirrors what is important and relevant in documents that have no relationship to Wikipedia. For example, system 100 may be configured to generate an inverted index for the concepts in database 105. The words in a user's document may then be processed against the inverted index to find those concepts that are most related to the article. These concepts may then be expanded using map 165 and contracted using map 170 as discussed previously. In addition, the categories from map 137 that correspond to the resulting categories may also be identified. In this fashion, a list of relevant concepts and categories for the user's document is readily generated in near real-time by system 100. System 100 may be linked to a database of other documents that have had their relevant concepts and categories generated in the same fashion. By comparing the relevant concepts and categories from the user's document to the corresponding concepts and categories for the documents in its document database, system 100 may then intelligently and quickly suggest relevant documents to the user, which greatly increases user interaction and satisfaction with system 100. The complexity of analyzing a document is thus solved by using the already-analyzed structure of an independent database such as Wikipedia as a proxy for human comprehension of the document so as to intelligently point the user to related documents. A method of analyzing a database to find concepts and categories related to a given user's interaction with a system will now be discussed.

Figure 4:
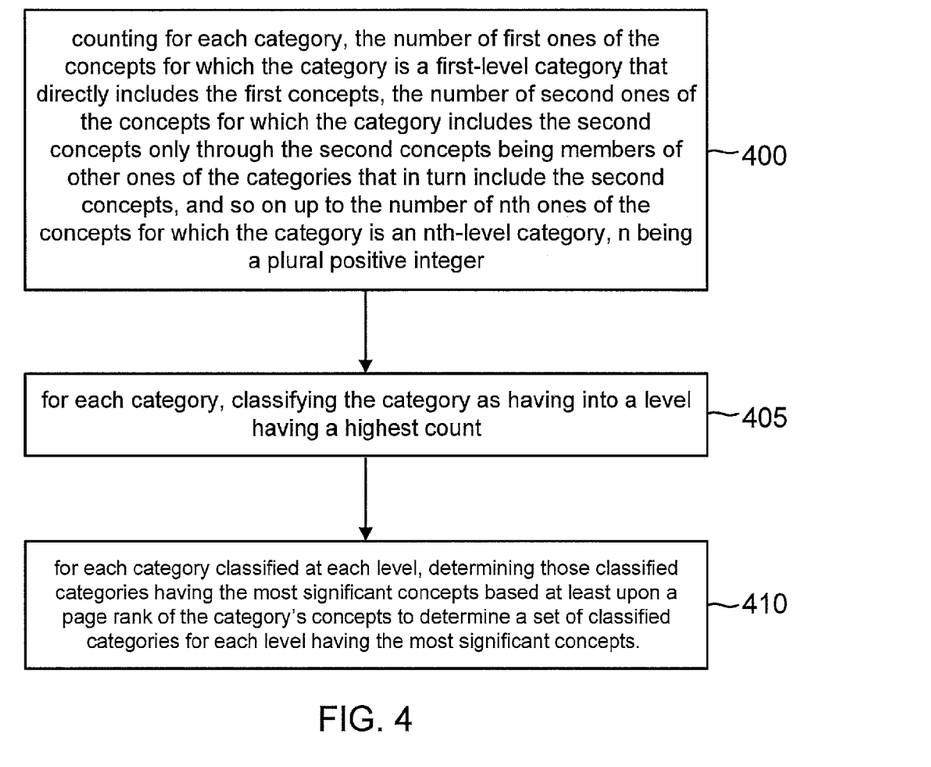
FIG. 4 is a flowchart for a method of analyzing a database having concepts organized into categories in accordance with an embodiment of the invention.

Turning now to FIG. 4, a flowchart for an example method of analyzing a database to find the relationship between its concepts and categories is provided. The method includes an act 400 of counting for each category, the number of first ones of the concepts for which the category is a first-level category that directly includes the first concepts, the number of second ones of the concepts for which the category includes the second concepts only through the second concepts being members of other ones of the categories that in turn include the second concepts, and so on up to the number of nth ones of the concepts for which the category is an nth-level category, n being a plural positive integer. The counting of categories 305, 306, and 310 in FIGS. 3A and 3B as belonging to particular levels with regard to concepts 300 and 315 is an example of act 400, in which case n would be 2. It will be appreciated, however, that n is an arbitrary positive integer and may be increased as necessary. For example, in other embodiments the interger n may equal 4 or greater.

The method further includes an act 405 comprising, for each category, classifying the category as having into a level having a highest count. The classifying of categories into respective ones of the n levels by category rank computation module 136 based upon their greatest counts is an example of act 405. Finally, the method includes an act 410 of, for each category classified at each level, determining those classified categories having the most significant concepts based at least upon a page rank of the category's concepts to determine a set of classified categories for each level having the most significant concepts. The filtering of the classified categories according to the page rank of their concepts as discussed with regard to the formation of category ranking map 137 by module 136 is an example of act 410.

Figure 5:
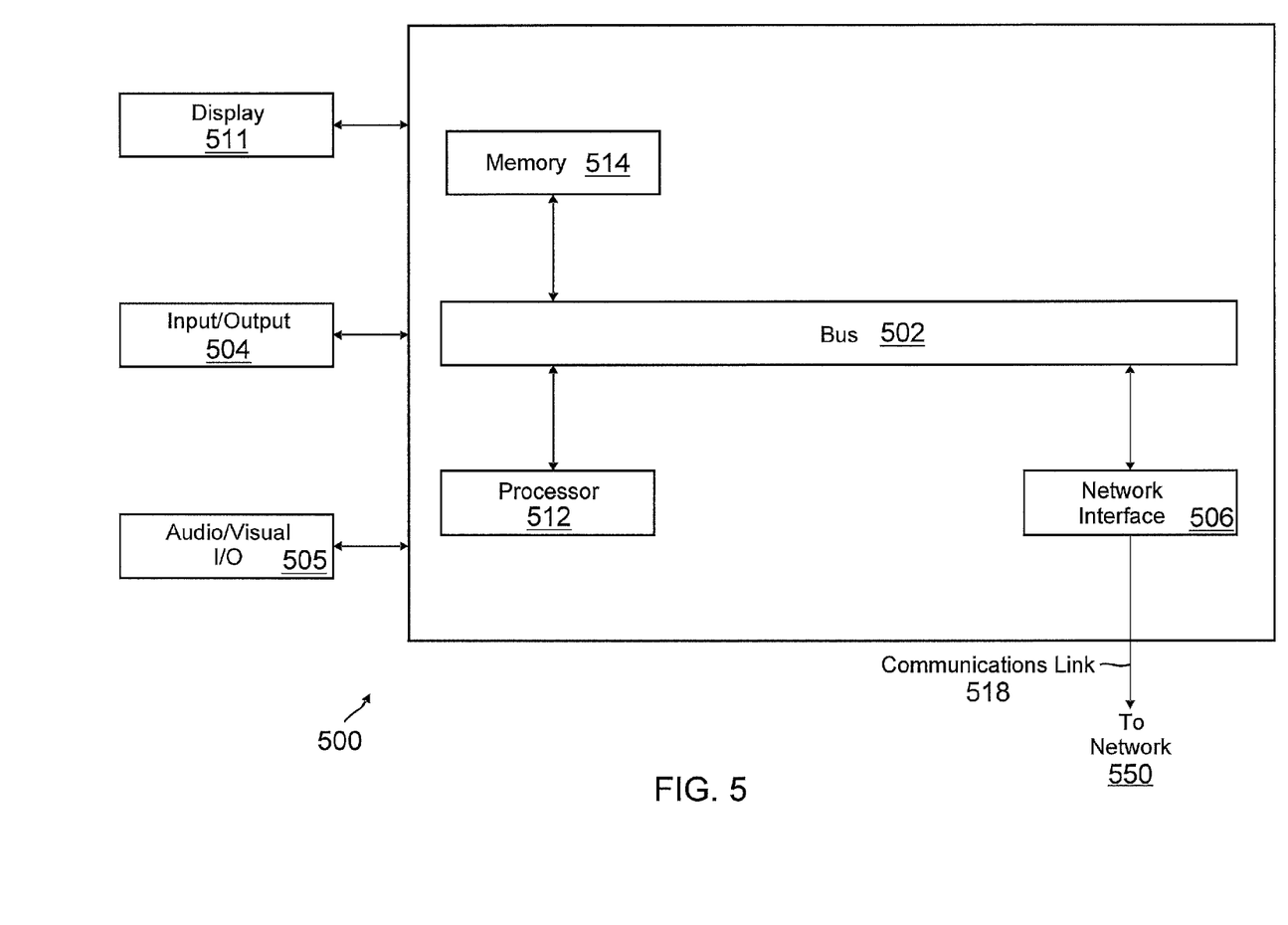
FIG. 5 is a block diagram for an example computer system that may be configured to implement the system of FIGS. 1A and 1B.

As discussed earlier, system 100 may be implemented using one or more computers or instead may be instantiated using a configured FPGA or ASIC(s). A suitable computer system 500 for implementing one or more modules for system 100 is shown in FIG. 5. An administrator may configure system 500 using a display 511, a keyboard 504, and audio/visual I/O 505. System 500 includes at least one processor coupled to a memory 514 of instructions through a bus 502. Bus 502 also couples to a network 550 such as the internet through a network interface 506 and a communications link 518. In this fashion, a user's interactions such the text of a document on a webpage hosted by system 500, a textual search query, or an spoken search query may be readily received by system 500 from network 550. Instructions stored in memory 514 that are executed by processor 512 to implement the various modules discussed herein may be written in Java or other suitable programming languages.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A machine-implemented method for analyzing Wikipedia concepts and Wikipedia categories, comprising:

accessing a website comprising an online encyclopedia associated with a plurality of documents, wherein the plurality of documents comprise Wikipedia categories each having one or more Wikipedia concepts in a database for the website;

counting for each Wikipedia category associated with the plurality of documents, a number of first ones of the Wikipedia concepts for which the Wikipedia category is a first-level Wikipedia category that directly includes the first Wikipedia concepts, a number of second ones of the Wikipedia concepts for which the Wikipedia category includes the second Wikipedia concepts only through the second Wikipedia concepts being members of other ones of the Wikipedia categories that in turn include the second Wikipedia concepts and so on up to the number of nth ones of the Wikipedia concepts for which the Wikipedia category is an nth-level Wikipedia category, n being a plural positive integer limited to a set maximum number for a hierarchy of the Wikipedia categories;

for each Wikipedia concept, identifying all other Wikipedia concepts that the Wikipedia concept hyperlinks to so as to generate a map of referenced Wikipedia concepts for each Wikipedia concept and determining a similarity score between the all other Wikipedia concepts and the Wikipedia concept as a ratio of an intersection of shared ones of the referenced Wikipedia concepts between the all other Wikipedia concepts and the Wikipedia concept per union of all of the references Wikipedia concepts in the all other Wikipedia concepts and the Wikipedia concept;

for each Wikipedia category, determining which of the n levels has a highest count and classifying the Wikipedia category into the level having the highest count;

for each level, determining which Wikipedia categories classified into the level have the most significant ones of the concepts based at least upon an average page rank of the Wikipedia category's concepts exceeding a threshold value for the average page rank of the Wikipedia category's concepts to determine a set of the classified Wikipedia categories for each level having the most significant concepts; and generating an inverted index associated with the database of the website using the Wikipedia concepts within the plurality of documents of the website, wherein the inverted index maps the Wikipedia concepts to the Wikipedia categories;

updating the inverted index using the map of referenced Wikipedia concepts, the similarity score, and the determining, for each level, which Wikipedia category classified into the level have the most significant ones of the concepts; and outputting, to a user accessing the website, at least one suggested document of the plurality of documents associated with an input performed by the user on the website, wherein the at least one suggested document navigates to one or more of the Wikipedia categories or the Wikipedia concepts based on the updated inverted index.

2. The machine-implemented method of claim 1, wherein a subset of the Wikipedia categories have a cyclic organization, the method further comprising breaking the cyclic organization for the subset of Wikipedia categories prior to classifying the Wikipedia categories.

3. The machine-implemented method of claim 2, further comprising:

forming a string from each Wikipedia category by using all non-capitalized letters; and comparing the strings from all the Wikipedia categories to identify those Wikipedia categories having identical strings; and merging any Wikipedia categories having identical strings into a single corresponding merged Wikipedia category.

4. The machine-implemented method of claim 1, further comprising:

receiving the input from a user;

analyzing the input to identify a first set of Wikipedia concepts suggested by the input; and referring the first set of Wikipedia concepts through the map of referenced Wikipedia concepts to identify additional Wikipedia concepts related to the first set of Wikipedia concepts.

5. The machine-implemented method of claim 1, further comprising:

receiving the input from a user;

analyzing the input to identify a first set of Wikipedia concepts suggested by the input; and reducing the first set of Wikipedia concepts according to whether each Wikipedia concept in the first set exceeds a threshold page rank concept to form a reduced set of Wikipedia concepts having significant page ranks.

6. The machine-implemented method of claim 5, further comprising:

analyzing use statistics to identify a usage popularity for each Wikipedia concept, wherein reducing the first set of Wikipedia concepts to form the reduced set of Wikipedia concepts further comprises applying a usage popularity threshold to the first set of Wikipedia concepts such that only Wikipedia concepts in the first set that have a usage popularity exceeding the usage popularity threshold can belong to the reduced set of Wikipedia concepts.

7. The machine-implemented method of claim 1, further comprising:

receiving a textual input from a user; and comparing words in the textual input to the updated inverted index to identify a set of related Wikipedia concepts to the textual input.

8. The machine-implemented method of claim 7, further comprising comparing the related Wikipedia concepts to the set of classified Wikipedia categories for each level having the most significant Wikipedia concepts to identify a reduced set of classified Wikipedia categories including the related Wikipedia concepts.

9. The machine-implemented method of claim 8, further comprising using the set of related Wikipedia concepts and the reduced set of classified Wikipedia categories to suggest content to the user that is related to their textual input.

10. The machine-implemented method of claim 1, further comprising:

analyzing the map of referenced Wikipedia concepts to identify any intersection between the referenced Wikipedia concepts from each Wikipedia concept to the referenced Wikipedia concepts to all the remaining Wikipedia concepts.

11. A system comprising:

a parser module configured to parse Wikipedia concepts to identify for each Wikipedia concept, all other Wikipedia concepts that the Wikipedia concept hyperlinks to so as to generate a concept reference map listing all referenced Wikipedia concepts for each Wikipedia concept, wherein the Wikipedia concepts are included in a website comprising an online encyclopedia associated with a plurality of documents for the Wikipedia concepts in a database of the website;

a disambiguation page extractor module configured to identify all disambiguation pages in Wikipedia that list Wikipedia concepts that are phrased the same but correspond to different textual pages; and a disambiguation module configured to filter the map of referenced Wikipedia concepts to remove disambiguation pages to form a filtered Wikipedia concept reference map; and a similarity computation module executed by at least one hardware processor and configured to process the filtered Wikipedia concept reference map to determine a similarity score between the all other Wikipedia concepts and the Wikipedia concept as a ratio of an intersection of shared ones of the referenced Wikipedia concepts between the all other Wikipedia concepts and the Wikipedia concept per union of all of the references Wikipedia concepts in the all other Wikipedia concepts and the Wikipedia concept, wherein the similarity computation module further generates an inverted index associated with the database of the website using the Wikipedia concepts within the plurality of documents of the website, wherein the inverted index maps the Wikipedia concepts to similar ones of the Wikipedia concepts, updates the inverted index using the filtered Wikipedia concept reference map and the similarity score, and outputs, to a user accessing the website, at least one suggested document of the plurality of documents associated with an input performed by the user on the website, wherein the at least one suggested document navigates to one or more of the Wikipedia concepts based on the updated inverted index.

12. The system of claim 11, wherein the system is further configured to process the input from a user to identify a set of Wikipedia concepts related to the input and to further process the set of Wikipedia concepts with regard to the list of similarity-weighted Wikipedia concepts to identify a set of related Wikipedia concepts to the set of Wikipedia concepts.

\* \* \* \* \*